United States Patent [19]

Peterson et al.

[11] Patent Number: 5,709,516
[45] Date of Patent: Jan. 20, 1998

[54] WASHER FACED SPRING ASSEMBLY

[75] Inventors: Ivan H. Peterson; James S. Hoelle, both of Hamilton; Dale E. Hampshire, Mason, all of Ohio

[73] Assignee: General Electric Company, Cincinnati, Ohio

[21] Appl. No.: 621,051

[22] Filed: Mar. 22, 1996

Related U.S. Application Data

[63] Continuation of Ser. No. 228,629, Apr. 18, 1994, abandoned.

[51] Int. Cl.$^6$ ............................................. F16B 43/02
[52] U.S. Cl. ................................... 411/544; 267/162
[58] Field of Search ............................. 411/535, 536, 411/544, 531, 546; 267/161, 162, 164; 248/601, 608

[56] References Cited

U.S. PATENT DOCUMENTS

| | | |
|---|---|---|
| 330,492 | 11/1885 | Johnson. |
| 362,572 | 5/1887 | Clauss ............................ 411/544 |
| 895,113 | 8/1908 | Scott ............................. 411/544 |
| 1,688,180 | 10/1928 | Ferry. |
| 1,826,415 | 10/1931 | Bragg ........................... 267/161 |
| 1,929,009 | 10/1933 | Williams ....................... 411/531 |
| 2,033,100 | 3/1936 | Kellogg ......................... 411/176 |
| 2,153,605 | 4/1939 | Williams ....................... 411/531 |
| 2,485,010 | 10/1949 | Nicolet. |
| 2,565,108 | 8/1951 | Zahodiakin .................... 267/162 |
| 2,713,482 | 7/1955 | Stapleton. |
| 3,604,306 | 9/1971 | Denholm. |
| 4,400,861 | 8/1983 | Parker .......................... 267/161 |
| 4,690,365 | 9/1987 | Miller ........................... 411/544 |
| 5,096,350 | 3/1992 | Peterson ........................ 411/546 |
| 5,180,268 | 1/1993 | Richardson. |
| 5,261,228 | 11/1993 | Shuba. |

FOREIGN PATENT DOCUMENTS

| | | | |
|---|---|---|---|
| 10752 | of 1934 | Australia ................. | 411/531 |
| 81348 | 2/1920 | Austria .................... | 267/161 |
| 3148730 | 7/1983 | Germany ................ | 411/10 |
| 3643781 | 6/1988 | Germany ................ | 267/161 |
| 133437 | 8/1929 | Switzerland ............ | 411/544 |

*Primary Examiner*—Flemming Saether
*Attorney, Agent, or Firm*—Andrew C. Hess; Patrick R. Scanlon

[57] ABSTRACT

A washer faced spring assembly is disclosed for a motion absorbing and motion damping application which includes a first washer having a circular or polygonal hole therethrough centered about a central axis, a second washer disposed opposite to the first washer also having a circular or polygonal hole therethrough centered about a central axis disposed generally coincident with the hole of the first washer, and a spring connected between the first washer and the second washer, the spring including a plurality of fingers providing planar or full surface contact between the first and second washers. The washer faced spring assembly may also include a base portion utilized in conjunction with the plurality of fingers, where the base portion has one of several alternative shapes, such as circular or polygonal.

3 Claims, 5 Drawing Sheets

WASHER FACED SPRING ASSEMBLY

This application is a Continuation of application Ser. No. 08/228,629 filed Apr. 18, 1994, now abandoned.

BACKGROUND OF THE INVENTION

1. Field of the Invention

The present invention relates to a specially configured washer faced spring assembly which is resistant to wear caused by relative motion between the spring assembly and the attaching hardware, and, more particularly, a washer faced spring assembly which can be utilized in the mounting of a manifold of an active clearance control system in the low pressure turbine of a gas turbine engine.

2. Description Of Related Art

Springs are utilized throughout gas turbine engines, including aircraft engines, in order to dampen movement caused by thermal stress or the like. For example, a manifold for an active clearance control in a low pressure turbine must move independently from the case in order to reduce and accommodate thermal stress. In this embodiment, a spring is utilized to provide a normal force to prevent "rattling" of the manifold and allow for size tolerances of the attaching hardware.

Current springs utilized for the aforementioned application are of the type that have curved, wave, or bellville washers. Such springs exhibit excessive wear because relative motion between the spring and the attaching hardware erodes the point or line contact made between the spring and the hardware. Thus, the spring deteriorates with time. Moreover, it has been found that the addition of a wear coating to such springs is not practical because it will be beneficial only for surface contact.

In order to overcome the problems associated with prior springs, the washer faced spring assembly of the present invention has full surface (planar) contact with the attaching hardware of a gas turbine engine which allows it to sustain the relative motion between the spring assembly and attaching hardware.

SUMMARY OF THE INVENTION

In accordance with one aspect of the present invention, a washer faced spring assembly is disclosed for a motion absorbing and motion damping application which includes a first washer having a circular or polygonal hole therethrough centered about a central axis, a second washer disposed opposite to the first washer also having a circular or polygonal hole therethrough centered about a central axis disposed generally coincident with the hole of the first washer, and a spring connected between the first washer and the second washer, the spring including a plurality of fingers providing planar or full surface contact between the first and second washers. The washer faced spring assembly may also include a base portion utilized in conjunction with the plurality of fingers, where the base portion has one of several alternative shapes, such as circular or polygonal.

BRIEF DESCRIPTION OF THE DRAWING

While the specification concludes with claims particularly pointing out and distinctly cling the present invention, it is believed that the present invention can be appreciated from the following description taken in conjunction with the accompanying drawing in which:

DETAILED DESCRIPTION OF THE INVENTION

Figure 1:
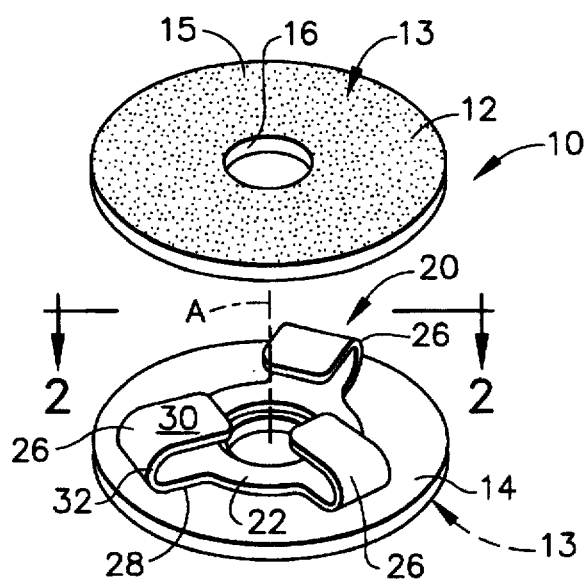
FIG. 1 is an illustration of an exploded perspective view of a first embodiment of the washer faced spring assembly of the present invention.
Figure 2:
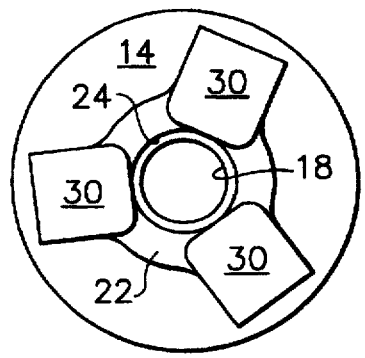
FIG. 2 is an illustration of a top view of the washer faced spring assembly depicted in FIG. 1 taken along line 2—2.

Referring now to the drawings in detail, wherein identical numerals indicate the same elements throughout the figures, FIGS. 1 and 2 depict a preferred embodiment of the washer faced spring assembly 10 of the present invention. As seen in FIG. 1, washer faced spring assembly 10 includes a first substantially planar metal washer 12 and a second substantially planar metal washer 14 disposed opposite thereto. Each of washers 12 and 14 includes a central opening or hole therethrough, identified by the numerals 16 and 18, respectively, for receiving mounting hardware therethrough. Holes 16 and 18 are preferably of the same circular or polygonal configuration and are preferably located at the center of washers 12 and 14 about a central axis A so that washers 12 and 14 align when they are positioned together during mounting.

A spring means, generally identified by the numeral 20, is positioned between washers 12 and 14. Spring means 20 preferably includes a substantially planar base portion 22 having a hole 24 therethrough, which preferably has the same circular or polygonal configuration as holes 16 and 18 through washers 12 and 14, so that upon assembly hole 24 of base 22 is in alignment with holes 16 and 18 of washers 12 and 14 along central axis A. This allows a bolt to be threaded through washers 12 and 14 and spring means 20 for attachment of washer faced spring assembly 10 to other hardware. Spring means 20 also includes a plurality of fingers 26 formed about the periphery of base portion 22. As seen in FIG. 1, fingers 26 are approximately 10 times as wide as they are thick, extend radially out from central axis A and then curve or bend back toward central axis A in a horseshoe-shaped configuration. Accordingly, each of the fingers 26 has a first portion 28 which is attached to and substantially coplanar with base portion 22, a second portion 30 which can lie in a plane parallel to or substantially parallel to the plane of base portion 22, and a third portion 32 which is a curved transition between first and second portions 28 and 30.

Spring means 20 can be permanently attached to the washer 12 about second portion 30 of fingers 26. In this manner, planar or full surface contact is provided between spring means 20 and washer 12. This planar contact is in sharp contrast to prior springs where only point or line contact is provided. Spring means 20 is also connected to washer 14 by means of base portion 22 and first portion 28 of finger 26 so that planar or full surface contact is provided between spring means 20 and washer 14. The mechanism for permanently connecting spring means 20 to washers 12 and 14 is not controlling, and may be implemented by several well known procedures such as welding or brazing. In order to help sustain wear caused by relative motion between washer faced spring assembly 10 and attaching hardware, washers 12 and 14 preferably include a wear resistant coating 13, such as T400 or copper nickel indium, for the outer surfaces thereof (see FIG. 1 where coating 13 is shown on the outer surface 15 of washer 12). Also, it will be understood that washers 12 and 14 may be of a material different from that used for spring means 20 (e.g., Incoriel 718 for washers 12 and 14 and AMS 5598A for spring means 20), depending on environmental conditions. This allows a stronger material to be used for spring means 20, if desired.

Figure 11:
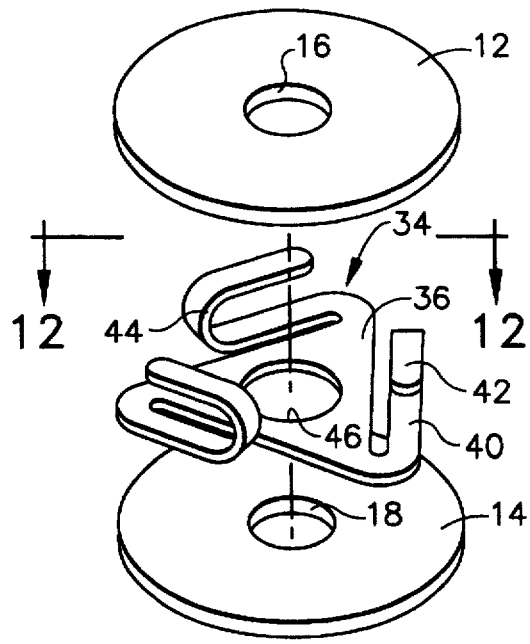
FIG. 11 is an illustration of an exploded perspective view of a sixth embodiment of the washer faced spring assembly of the present invention.
Figure 12:
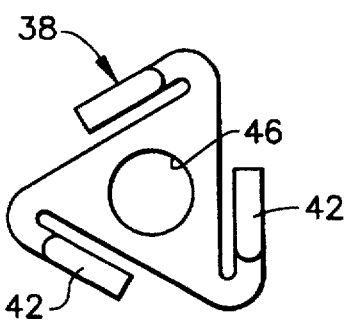
FIG. 12 is an illustration of a top view of the spring portion of the washer faced spring assembly depicted in FIG. 11 taken along line 12—12.

It will be noted that base 22 of spring means 20 in FIGS. 1 and 2 is illustrated as substantially circular, but such base portion may also be polygonally configured, as for instance triangular as shown in FIGS. 11 and 12. As seen in FIG. 11, washers 12 and 14 are again provided with holes 16 and 18 about a central axis A. However, due to the triangular design of base portion 36 of spring means 34 therein, fingers 38 are provided as extensions to the three corners thereof. Fingers 38 are substantially parallel to the sides of base portion 36, or alternatively can be considered as articulated edge portions of base 36. In the same manner as FIGS. 1 and 2, fingers 38 include a first portion 40 which lies adjacent to and is substantially coplanar with base portion 36, a second portion 42 which is in a plane substantially parallel to base portion 36, and a third portion 44 which is a curved transition between first and second portions 38 and 42. The base portion 36 also includes a hole 46 therethrough, the center of which is coincident with central axis A. As described above, full surface or planar contact is provided between spring means 34 and washer 12, as well as spring means 34 and washer 14.

Figure 3:
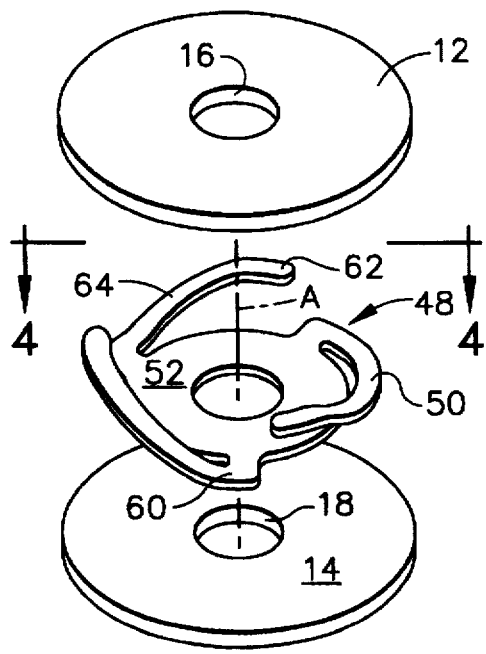
FIG. 3 is an illustration of an exploded perspective view of a second embodiment of the washer faced spring assembly of the present invention.
Figure 3A:
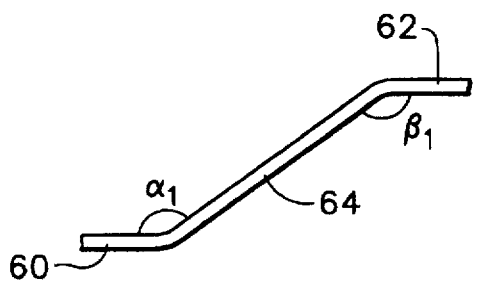
FIG. 3A is an illustration of a side view of a finger shown in FIG. 3.
Figure 4:
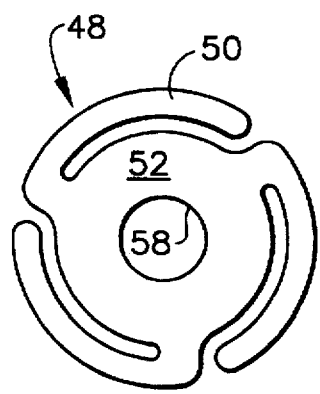
FIG. 4 is an illustration of a top view of the washer faced spring assembly depicted in FIG. 3 taken along line 4—4.
Figure 7:
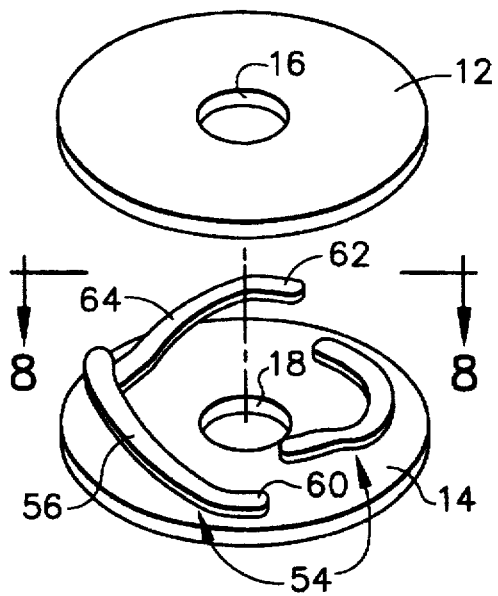
FIG. 7 is an illustration of an exploded perspective view of a fourth embodiment of the washer faced spring assembly of the present invention.
Figure 8:
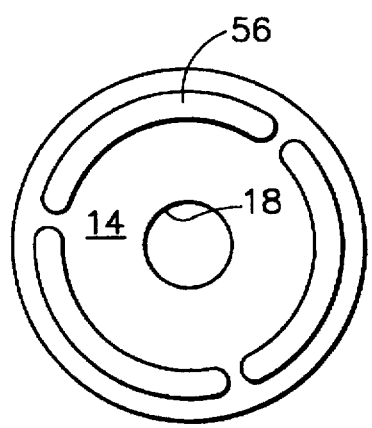
FIG. 8 is an illustration of a top view of the spring and bottom washer of the washer faced spring assembly depicted in FIG. 7 taken along line 8—8.

As is shown in FIGS. 3–4 and 7–8, the fingers 50 and 56 of washer faced spring assembly 10 may have a design having a compound angle configuration. By compound angle configuration, it is meant that fingers 50 and 56 respectively of the springs of these embodiments include a first portion 60 which upon assembly lies in a plane substantially parallel to the plane of washers 12 and 14, a second portion 62 which also lies in a plane substantially parallel to the plane of washers 12 and 14 (but in a separate plane from first portion 60), and a third transition portion connecting first portion 60 and second portion 62 which is at a first angle $\alpha_1$ to first portion 60 and a second angle $\beta_1$ to second portion 62. Preferably, angles $\alpha_1$ and $\beta_1$ are equivalent but 180° out of phase (see FIG. 3A). Angles $\alpha_1$ and $\beta_1$ will preferably fall within a range of 135°–165°, with an angle of 160° being most preferred. In particular, as is shown in FIGS. 3–4 and 7–8, fingers 50 and 56, respectively, are preferably arc-shaped and when compressed into the plane of the base preferably exhibit a radius of curvature centered along central axis A with the length of the radius being selected to ensure that the fingers 50 and 56 are completely contained within the periphery of washers 12 and 14 and yet not intersect holes 16 and 18. One distinction between spring means 48 in FIGS. 3–4 and spring means 54 in FIGS. 7–8 is that spring means 48 includes a base 52 from which fingers 50 extend, while fingers 56 in FIGS. 7–8 are attached directly to washer 14. It is preferred that base portion 52 of spring means 48 include a hole 58 therethrough which is coincident with holes 16 and 18 of washers 12 and 14. Full surface or planar contact is provided between second portion 62 of finger 50 and washer 12, as well as first portion 60 of finger 50 and washer 14.

Figure 9:
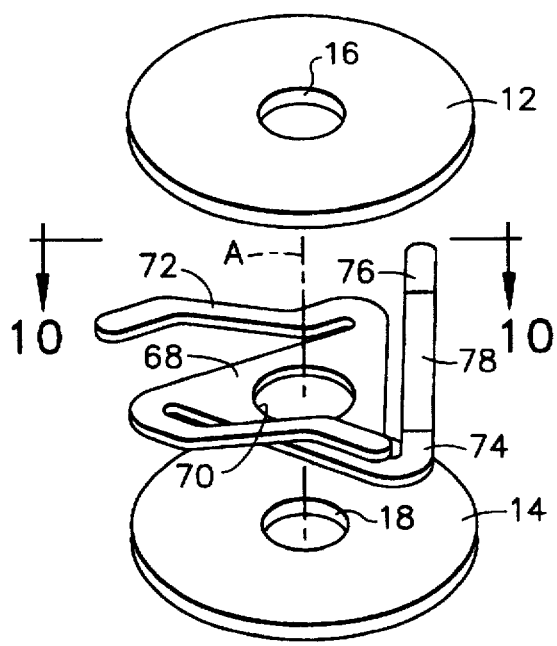
FIG. 9 is an illustration of an exploded perspective view of a fifth embodiment of the washer faced spring assembly of the present invention.
Figure 9A:
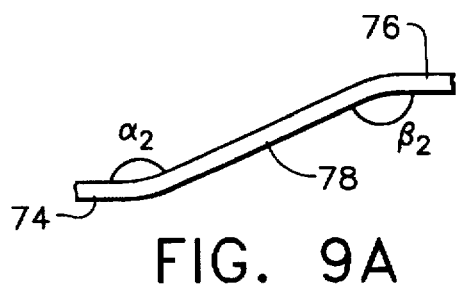
FIG. 9A is an illustration of a side view of a finger shown in FIG. 9.
Figure 10:
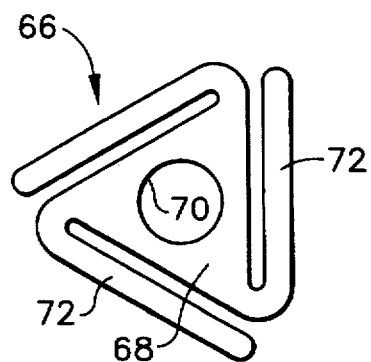
FIG. 10 is an illustration of a top view of the spring portion of the washer faced spring assembly depicted in FIG. 9 taken along line 10—10.

As shown in FIGS. 9–10, spring means 66 has a triangular base 68 with a hole 70 therethrough which is coincident with holes 16 and 18 about central axis A. Fingers 72 extend from each corner of base 68 like that depicted in FIGS. 11–12, but have a compound angle configuration similar to that depicted in FIGS. 3–4 and 7–8. Specifically, fingers 72 include a first portion 74 which lies adjacent to and substantially coplanar with base portion 68, a second portion 76 which is substantially parallel to and attached to washer 12, and a third portion 78 connecting first and second portions 74 and 76, respectively. Preferably, first portion 74 is oriented at a first angle $\alpha_2$ to third portion 78 and second portion 76 is oriented at a second angle $\beta_2$ to third portion 78, angles $\alpha_2$ and $\beta_2$ being substantially equivalent and 180° out of phase (see FIG. 9A). Preferably, angles $\alpha_2$ and $\beta_2$ will be in a range of 135°–165°, with 160° being most preferred. Full surface or planar contact is provided between second portion 76 of spring means 66 and washer 12, as well as first portion 74, base portion 68 and washer 14.

Figure 5:
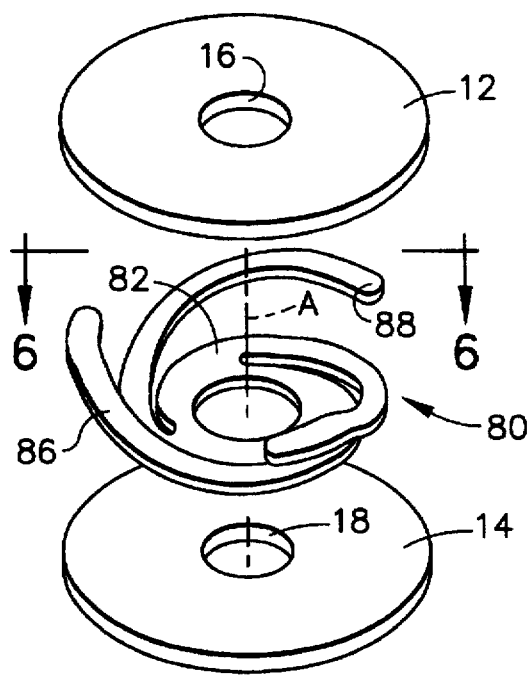
FIG. 5 is an illustration of an exploded perspective view of a third embodiment of the washer faced spring assembly of the present invention.
Figure 6:
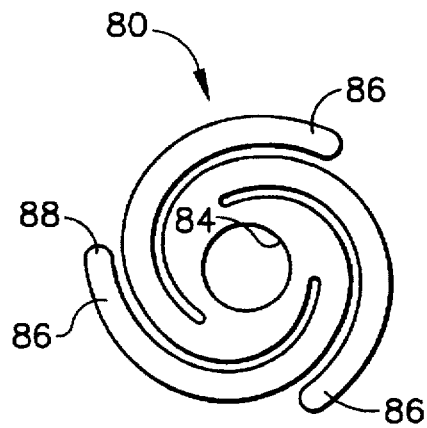
FIG. 6 is an illustration of a top view of the spring portion depicted in FIG. 5 taken along line 6—6.

Another alternative embodiment is depicted in FIGS. 5–6, where spring means 80 is shown having a generally planar spiral design. Spring means 80 includes a base 82 having a hole 84 therethrough which is coincident with holes 16 and 18 in washers 12 and 14 about central axis A. Fingers 86 are provided which extend circumferentially about base 82 and spiral therefrom to terminate at tips 88. Tips 88 of fingers 86 are then able to be attached to washer 12 while base portion 82 is attached to washer 14. There is full surface or planar contact between finger tips 88 and washer 12, as well as between base portion 82 and washer 14.

Figure 13:
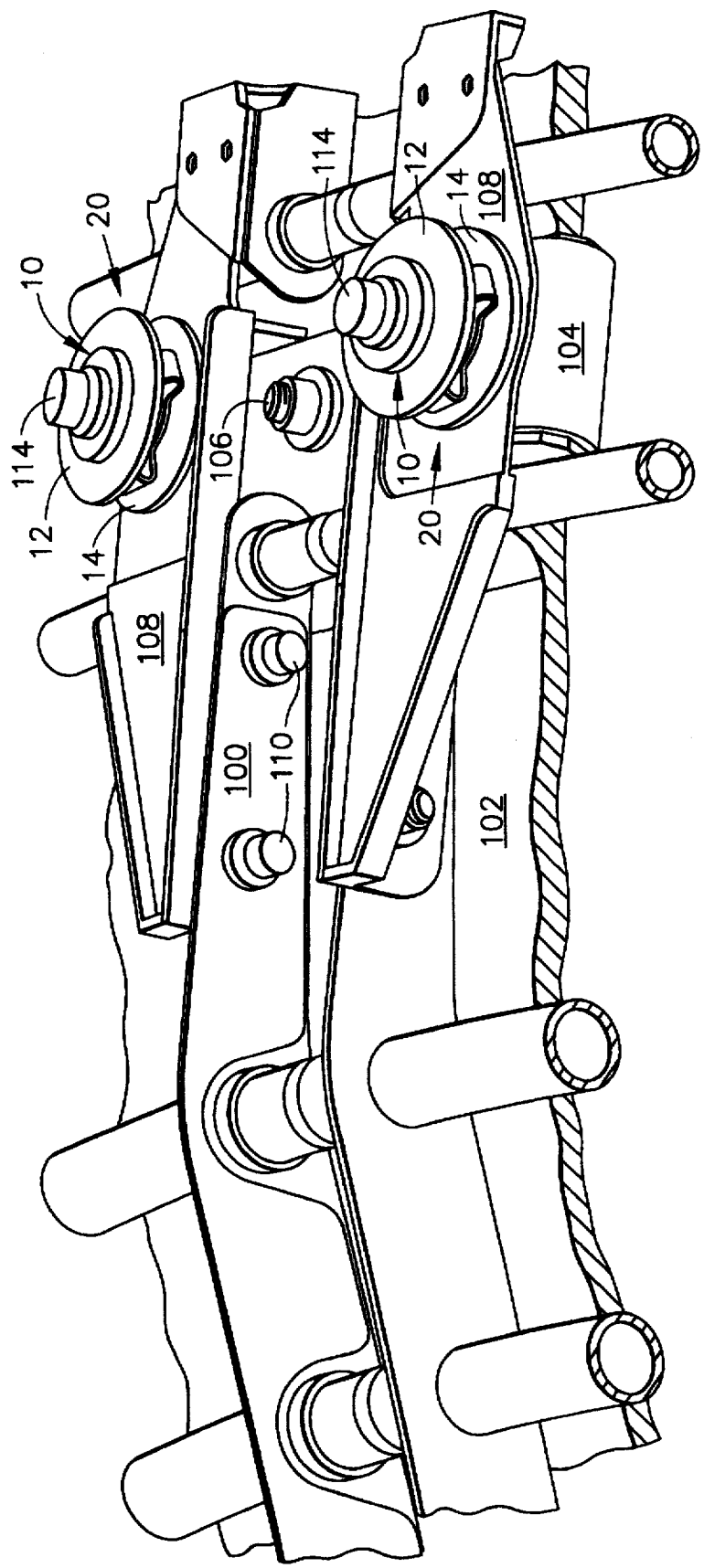
FIG. 13 is an illustration of a partial perspective view of an active clearance control manifold attached to a casing of a low pressure turbine of a gas turbine engine.
Figure 14:
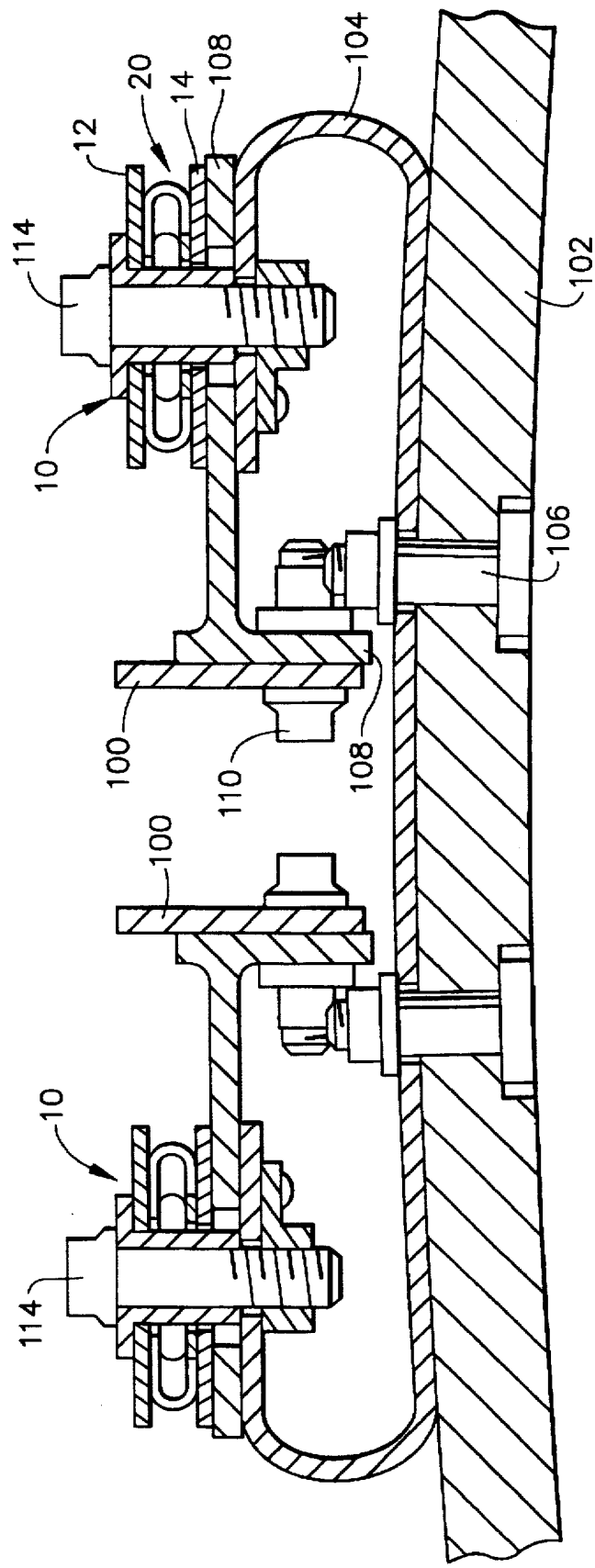
FIG. 14 is an illustration of a partial cross-sectional view of the attaching hardware depicted in FIG. 13 including a washer faced spring assembly like that depicted in FIGS. 1 and 2.

As has been shown herein, there are several different embodiments for the washer faced spring assembly 10 of the present invention. In each of these embodiments, the principal function is to absorb relative motion between the spring assembly and attaching hardware in a gas turbine engine. One particular application for washer faced spring assembly 10 is the attachment of an active clearance control manifold to a low pressure turbine of a gas turbine engine. Since the manifold must move independently from the case of the low pressure turbine to reduce thermal stress, washer faced spring assembly 10 can be utilized to provide a normal force to prevent rattling of the manifold and allow for size tolerances of the attaching hardware. The implementation of washer faced spring assembly 10 in this application is seen in FIGS. 13 and 14, where it will be understood that the active clearance control manifold and low pressure turbine case are of a design well-known in the industry, an example of which can be found in U.S. Pat. No. 5,261,228 to General Electric Company, which is hereby incorporated by reference.

As seen in FIGS. 13 and 14, a rail 100 of an active clearance control is mounted to a case 102 of a low pressure turbine. This is accomplished by means of a base bracket 104, which is attached to case 102 by means of mounting bolts 106, and an outer bracket casting 108 attached to rail 100 at one end by bolts 110 and base bracket 104 at the other end by bolts 114. Base bracket 104 is generally of a U-shaped design. In order to absorb relative motion between case 102 and rails 100, washer faced spring assembly 10 of the design depicted in FIGS. 1 and 2 is attached to base bracket 104 and outer bracket casting 108 also by bolts 114, where outer bracket casing 108 is parallel to case 102.

Having shown and described the preferred embodiment of the present invention, further adaptations of the washer faced spring assembly for absorbing relative motion in a gas turbine engine between attached parts can be accomplished by appropriate modifications by one of ordinary skill in the art without departing from the scope of the invention. Moreover, it will be understood while implementation of the washer faced spring assembly is shown with respect to relative motion between an active clearance control and a low pressure turbine casing, such washer faced spring assemblies of the present invention may be utilized in a gas turbine engine wherever relative motion between parts requires damping.

What is claimed is:

1. A washer faced spring assembly, comprising:

(a) a first washer having a first hole formed therein;

(b) a second washer having a second hole formed therein, said second washer disposed opposite to said first washer so that said second hole is generally coincident with said first hole; and (c) spring means disposed between said first washer and said second washer, said spring means including a generally circular base portion, having a central axis and a third hole formed therein which is disposed generally coincident with said first and second holes and a plurality of spring fingers, each of said fingers having a first portion in substantially planar contact wick said first washer, a second portion in substantially planar contact with said second washer and a third portion connecting said first and second portions, wherein said first portion of each one of said plurality of spring fingers is attached to the periphery of said base portion, and said base portion provides substantially planar contact with said first washer and said third portion of each one of said plurality of spring fingers is a curved transition between said first and second portions and said plurality of fingers extend radially out from said central axis and are bent back toward said central axis.

2. The washer faced spring assembly of claim 1, wherein the surfaces of said first and second washers opposite said spring means are treated with a wear resistant coating.

3. The washer faced spring assembly of claim 1, wherein said first and second washers are of a material different from said spring means.

* * * * *